(12) United States Patent
Merovitz et al.

(10) Patent No.: US 11,091,095 B2
(45) Date of Patent: Aug. 17, 2021

(54) TRUCK HEADLIGHT CIRCUIT

(71) Applicant: YourTruckShop Inc., Laval (CA)

(72) Inventors: Rick Merovitz, Laval (CA); David Merovitz, Laval (CA)

(73) Assignee: YOURTRUCKSHOP INC., Laval (CA)

( * ) Notice: Subject to any disclaimer, the term of this patent is extended or adjusted under 35 U.S.C. 154(b) by 0 days.

(21) Appl. No.: 16/158,058

(22) Filed: Oct. 11, 2018

(65) Prior Publication Data

US 2019/0106048 A1 Apr. 11, 2019

Related U.S. Application Data

(60) Provisional application No. 62/570,692, filed on Oct. 11, 2017.

(51) Int. Cl.
| | |
|---|---|
| *B60Q 11/00* | (2006.01) |
| *B60Q 1/04* | (2006.01) |
| *F21S 41/141* | (2018.01) |
| *F21Y 115/10* | (2016.01) |
| *H05B 45/3574* | (2020.01) |
| *H05B 45/50* | (2020.01) |
| *H01K 1/02* | (2006.01) |
| *F21S 41/162* | (2018.01) |
| *F21S 41/663* | (2018.01) |

(52) U.S. Cl.
CPC ............... *B60Q 11/005* (2013.01); *B60Q 1/04* (2013.01); *F21S 41/141* (2018.01); *F21S 41/162* (2018.01); *F21S 41/663* (2018.01); *H01K 1/02* (2013.01); *H05B 45/3574* (2020.01); *H05B 45/50* (2020.01); *F21Y 2115/10* (2016.08)

(58) Field of Classification Search
None
See application file for complete search history.

(56) References Cited

U.S. PATENT DOCUMENTS

| | | | |
|---|---|---|---|
| 4,888,524 A * | 12/1989 | Ganser | H05B 41/288 |
| | | | 315/220 R |
| 2019/0016249 A1* | 1/2019 | Ichikawa | B60Q 1/14 |

* cited by examiner

*Primary Examiner* — Ashok Patel
(74) *Attorney, Agent, or Firm* — Blank Rome LLP

(57) ABSTRACT

In replacing stock headlights on certain trucks with new Light Emitting Diode (LED) lights, the onboard diagnostic system of the trucks do not read sufficient load resistance from the new lights and so the diagnostic system indicates that there is an issue with the lighting system and consequently limits the functionality of the lighting system. The present application seeks to provide a solution to this problem by creating a headlight adapter that integrates components for imitating the load resistance and switching functions of Original Equipment Manufacturer (OEM) truck headlights (the "Headlight Adapter").

1 Claim, 1 Drawing Sheet

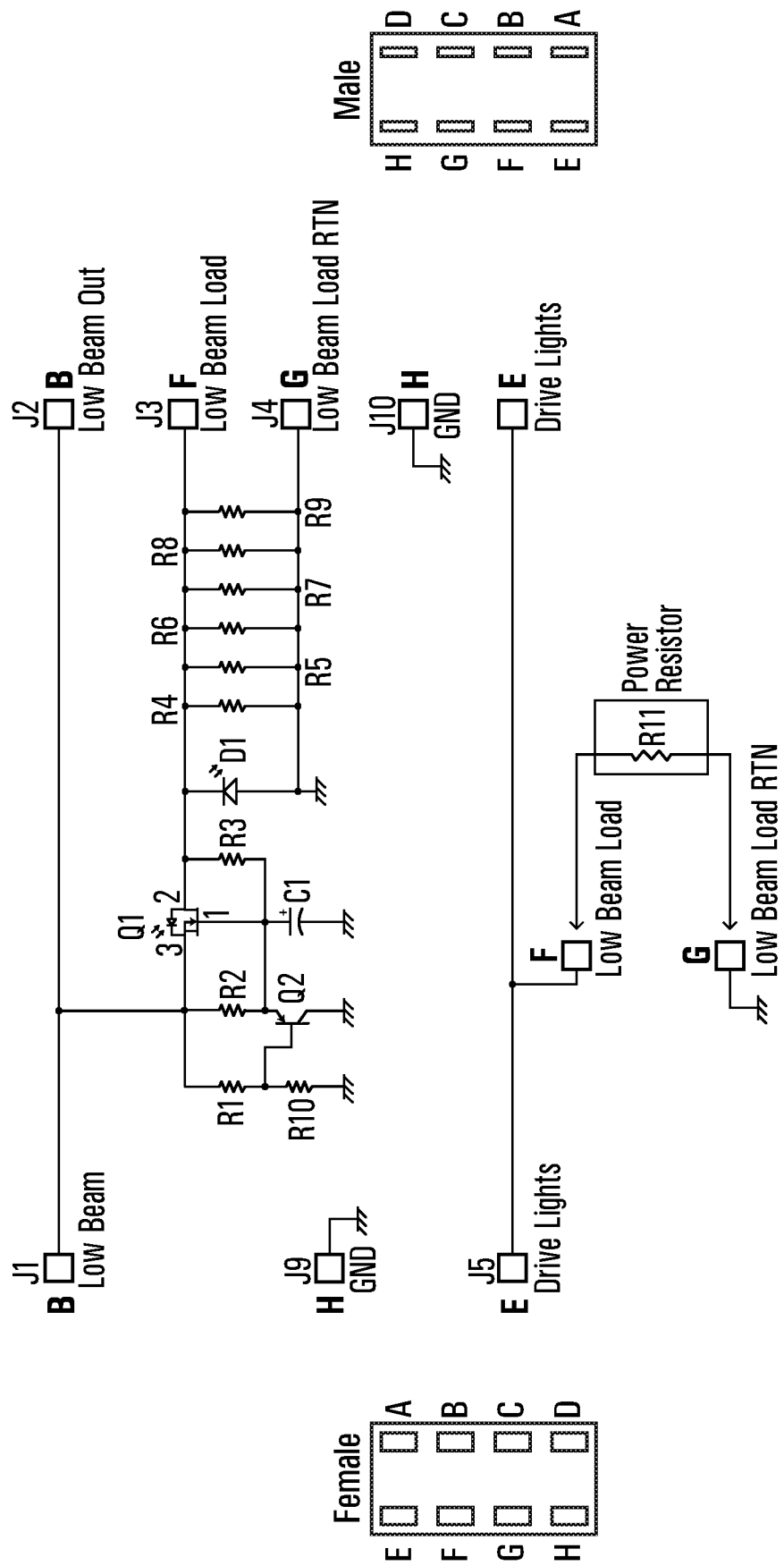

TRUCK HEADLIGHT CIRCUIT

CROSS-REFERENCE TO RELATED APPLICATION

This application claims priority to U.S. Provisional Application No. 62/570,692, filed Oct. 11, 2017, the content of which are incorporated herein for all legal purposes.

FIELD OF INVENTION

The invention relates to the field of LED light electrical circuits.

SUMMARY

In replacing stock headlights on certain trucks with new Light Emitting Diode (LED) lights, the onboard diagnostic system of the trucks do not read sufficient load resistance from the new lights and so the diagnostic system indicates that there is an issue with the lighting system and consequently limits the functionality of the lighting system. The present application seeks to provide a solution to this problem by creating a headlight adapter that integrates components for imitating the load resistance and switching functions of Original Equipment Manufacturer (OEM) truck headlights (the "Headlight Adapter ").

DESCRIPTION OF THE DIAGRAMS

FIG. 1 describes a circuit capable of imitating the load resistance and switching functions of OEM truck headlights.

DESCRIPTION OF THE INVENTION

Stock headlight replacement poses an issue in the trucking industry for certain trucks with new LED lights. The onboard diagnostic system of these trucks do not read sufficient load resistance from the new LED lights and so the diagnostic system indicates that there is an issue with the lighting system which consequently limits the functionality of the lighting system.

The present invention seeks to provide a solution to this problem by creating a headlight adapter that integrates components for imitating the load resistance and switching functions of original equipment manufacturer (OEM) truck headlights.

The invention consists of an LED headlight adapter that integrates a series of transistors and resistors into the circuit to imitate the load resistance on incandescent lights and adjust for the delay that was experienced when transitioning from the low-beam to high-beam setting.

In FIG. 1, power is applied to circuit "B". The transistor is turned "on" via the capacitor being discharged. The transistor then applies the load of resistors "R4-R9" to wire "B" for a time constant set by the capacitor and resistor "R2". After the capacitor has charged, the transistor is turned "off" removing the load from "B". The capacitor is then discharged by the transistor when power is removed from circuit "B". A load resistor adds a load to circuit "E" to match the expected current from an OEM truck headlight, resulting in a circumvention of the onboard diagnostic system of the truck not reading that there is an insufficient load.

The invention claimed is:
1. A headlight adapter circuit, comprising:
a B node, an F node, and a G node;
a first resistor coupled to the B node;
a second resistor coupled to the B node;
a capacitor;
a first transistor coupled to the B node, an F node, and the capacitor;
a third resistor coupled to the F node and the capacitor;
a second transistor coupled to the capacitor, the first transistor, the first resistor, the second resistor, and the third resistor;
a diode coupled to the F node and a G node;
a fourth, a fifth, a sixth, a seventh, an eighth, and a ninth resistor coupled in parallel to the F node and the G node;
a tenth resistor coupled to the first resistor and the second transistor; and
an eleventh resistor coupled to the F node and the G node, wherein the eleventh resistor comprises a power resistor, and wherein the F node is coupled to an E node.

* * * * *